(12) United States Patent
Liao et al.

(10) Patent No.: US 11,465,391 B2
(45) Date of Patent: Oct. 11, 2022

(54) DETECTABLE DUST-PROOF PAPER

(71) Applicant: NAN YA PLASTICS CORPORATION, Taipei (TW)

(72) Inventors: Te-Chao Liao, Taipei (TW); Ching-Yao Yuan, Taipei (TW); Wen-Jui Cheng, Taipei (TW); Yu-Chi Hsieh, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 325 days.

(21) Appl. No.: 16/794,451

(22) Filed: Feb. 19, 2020

(65) Prior Publication Data
US 2021/0122140 A1 Apr. 29, 2021

(30) Foreign Application Priority Data
Oct. 29, 2019 (TW) ................................ 108138952

(51) Int. Cl.
| | | |
|---|---|---|
| *B32B 15/02* | (2006.01) | |
| *B32B 7/12* | (2006.01) | |
| *B32B 15/09* | (2006.01) | |
| *B32B 15/085* | (2006.01) | |

(52) U.S. Cl.
CPC ............. *B32B 15/02* (2013.01); *B32B 7/12* (2013.01); *B32B 15/085* (2013.01); *B32B 15/09* (2013.01); *B32B 2305/347* (2013.01); *B32B 2307/732* (2013.01); *B32B 2309/105* (2013.01)

(58) Field of Classification Search
CPC .................................. B32B 15/02; B32B 7/12
USPC ............................................................ 235/488
See application file for complete search history.

(56) References Cited

U.S. PATENT DOCUMENTS

| | | | |
|---|---|---|---|
| 6,951,692 B1* | 10/2005 | Das ........................ | B42D 25/29 283/92 |
| 10,913,303 B2* | 2/2021 | Fu ........................... | B41M 5/508 |
| 2009/0020862 A1* | 1/2009 | Chen ...................... | G01L 19/141 257/676 |
| 2009/0127344 A1* | 5/2009 | Dostmann ............. | B42D 25/351 235/488 |
| 2016/0096395 A1* | 4/2016 | Jones .................... | B42D 25/328 219/121.69 |
| 2017/0182832 A1* | 6/2017 | Sailer ................... | B42D 25/351 |

(Continued)

FOREIGN PATENT DOCUMENTS

| | | |
|---|---|---|
| CN | 107858862 A | 3/2018 |
| JP | 4167348 B2 | 10/2008 |

*Primary Examiner* — Allyson N Trail
(74) *Attorney, Agent, or Firm* — Li & Cai Intellectual Property (USA) Office

(57) ABSTRACT

A detectable dust-proof paper is provided. The detectable dust-proof paper includes a detected layer, a first plastic layers, and a first ink-receptive layer. The detected layer has two opposite surfaces. The detected layer includes at least one metal which is selected from the group consisting of: aluminum, copper, nickel, iron, and a mixture or an alloy thereof. The first plastic layer is disposed on one of the two surfaces of the detected layer. A material of the first plastic layer is selected from the group consisting of: a polyolefin, a polyester, a polyamide, and any combination thereof. The first ink-receptive layer is disposed on the first plastic layer. The first ink-receptive layer contains an inorganic ink-absorption material ranging between a value larger than 0 wt % and 75 wt %.

9 Claims, 2 Drawing Sheets

(56) References Cited

U.S. PATENT DOCUMENTS

| | | | |
|---|---|---|---|
| 2017/0212284 A1* | 7/2017 | Wang | B32B 17/06 |
| 2019/0241005 A1* | 8/2019 | Mercier | B41M 3/14 |
| 2020/0339842 A1* | 10/2020 | Watanabe | C09J 115/00 |
| 2021/0078308 A1* | 3/2021 | Liao | B32B 27/32 |
| 2021/0296654 A1* | 9/2021 | Liang | H01M 4/668 |
| 2022/0009263 A1* | 1/2022 | Clement | B44C 5/04 |
| 2022/0037670 A1* | 2/2022 | Li | H01M 4/625 |

\* cited by examiner

DETECTABLE DUST-PROOF PAPER

CROSS-REFERENCE TO RELATED PATENT APPLICATION

This application claims the benefit of priority to Taiwan Patent Application No. 108138952, filed on Oct. 29, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a detectable dust-proof paper, and more particularly to a dust-proof paper that is capable of being metal-detected. The detectable dust-proof paper also can serve as a security paper.

BACKGROUND OF THE DISCLOSURE

In an age of rapid development in technology, one of the methods for companies or enterprises to make profit is to rapidly grasp growing trends and to research and develop products accordingly. Therefore, technology companies usually protect trade secrets by strictly controlling the circulation area and the circulation route of internal confidential information so as to prevent unexpected leakage of information.

According to statistics, internal confidential information can be leaked through network transmission (11.3%), hardware copies (13.1%), paper copies (72.6%), and others (2.7%). Among the foregoing, the leakage of trade secrets through paper copies is in the majority. Recently, with the rise of awareness in environmental protection, many companies and enterprises have endeavored to lower the usage of paper and promote data digitalization. However, paper still has a high usage ratio due to the convenience afforded by being able to be immediately read and written upon. Therefore, there is still a ways to go before companies can function completely paperlessly.

When the internal confidential information is recorded in a paper form, the internal confidential information is totally open and available to the public. When the internal confidential information is accidentally carried out of a safe area, anyone may risk unintentionally leaking the internal confidential information. Accordingly, most of the technology companies choose to use security paper. The security paper is marked with a specific imprint or a bar code, or embedded with a magnetic material which allows it to be detected by a corresponding detector. Therefore, a circulation area of the security paper can be controlled. Generally, the detectors are installed on entrances or exits of certain specific areas in the technology companies. When the imprint, the bar code, or the magnetic material of the security paper is detected by the detectors, the detectors will send out a warning to remind relevant personnel that the security paper is about to be carried out of a safe area. Consequently, the installation of the detectors can prevent the security paper from being taken out of the safe area.

In addition, a dedicated printer may be purchased especially for printing of the security paper. The dedicated printer has been built-in with identifying software or hardware so as to only permit identified security paper to be printed. By controlling the paper being printed, the trade secrets can further be protected to only be circulated in a specific area.

One kind of the security paper has an electrical imprint or a bar code to be detected by the detectors. Unfortunately, the electrical imprint or the bar code may be shielded sometimes, causing the electrical imprint or the bar code to be unable to be detected. In addition, the electrical imprint or the bar code may also be torn from the security papers by people with bad intention. When this occurs, the detectors will not be able to send out a warning, and will lose an anti-theft function.

Another kind of security paper contains a magnetic material, such as metal, which is embedded between two layers of paper. This kind of security paper has a similar appearance with that of normal paper. The surface of such security paper is without any imprint or bar code so that the security paper can be written upon or printed. However, the two layers of paper results in a large thickness of the security paper.

As mentioned above, a material of the security paper is based on paper. However, fibers on the surface of the security paper may generate dust after friction; hence, the security paper provided by a conventional technology is not suitable to be used in environments where a low dust concentration is required, such as in a dust-free room. Specifically, after friction, a normal paper will generate dust with a diameter larger than 0.3 μm at a concentration of higher than 10000 count/ft$^3$, which is calculated by a particle counter.

Further, the security paper made by paper is not waterproof and has a weak mechanical strength causing the security paper to have a short service life. Although the development of the security paper has reached maturity in a conventional technology, an improved security paper suitable for a dust-free room with properties of being dust-proof, water-proof, and tear-proof is still called for.

SUMMARY OF THE DISCLOSURE

In response to the above-referenced technical inadequacies, the present disclosure provides a detectable dust-proof paper which has functions of both a detectable dust-proof paper and a security paper. The detectable dust-proof paper has a water-proof property and a tear-proof property.

In one aspect, the present disclosure provides a detectable dust-proof paper, including a detected layer, a first plastic layer, and a first ink-receptive layer. The detected layer has two opposite surfaces. The detected layer includes at least one metal being selected from the group consisting of: aluminum, copper, nickel, iron, and a mixture or an alloy thereof. The first plastic layer disposed on one of the two surfaces of the detected layer. A material of the first plastic layer is selected from the group consisting of: a polyolefin, a polyester, a polyamide, and a combination thereof. The first ink-receptive layer disposed on the first plastic layer. The first ink-receptive layer contains an inorganic ink-absorption material ranging between a value larger than 0 wt % and 75 wt %.

In certain embodiments, the detected layer is a metal foil.

In certain embodiments, the detected layer includes at least one metal particle or at least one metal fiber. The at least one metal particle or the at least one metal is dispersed in the detected layer.

In certain embodiments, the inorganic ink-absorption material is selected from the group consisting of: aluminum oxide, aluminum hydroxide, silicon dioxide, calcium carbonate, titanium dioxide, barium sulfate, and a combination thereof.

In certain embodiments, a material of the first plastic layer is selected from the group consisting of: a polyethylene, a biaxially oriented polypropylene, a casting polypropylene, a casting PET, a biaxially oriented polyethylene terephthalate, and a polyimide.

In certain embodiments, the detectable dust-proof paper further includes a first adhesive layer sandwiched between the first plastic layer and the detected layer. The first adhesive layer is formed from a mixture of a waterborne polyurethane and an acrylic resin.

In certain embodiments, the first adhesive layer contains 1 wt % to 70 wt % of the waterborne polyurethane and 1 wt % to 70 wt % of the acrylic resin.

In certain embodiments, the detectable dust-proof paper further includes a second plastic layer and a second ink-receptive layer. The second plastic layer is disposed on another of the two surfaces of the detected layer. A material of the second plastic layer is selected from the group consisting of: a polyolefin, a polyester, a polyamide, and a combination thereof. The second ink-receptive layer is disposed on the second plastic layer. The second ink-receptive layer contains an inorganic ink-absorption material ranging between a value larger than 0 wt % and 75 wt %.

In certain embodiments, the detectable dust-proof paper further includes a second adhesive layer sandwiched between the second plastic layer and the detected layer. The second adhesive layer is formed from a mixture of a waterborne polyurethane and an acrylic resin.

In certain embodiments, a thickness of the detectable dust-proof paper is from 20 μm to 350 μm.

Therefore, the detectable dust-proof paper of the present disclosure has technical features of "the detectable dust-proof paper including the detected layer, the plastic layer, and the ink-receptive layer" and "the ink-receptive layer containing the inorganic ink-absorption material ranging between a value larger than 0 wt % and 75 wt %", so that the detectable dust-proof paper of the present disclosure can replace conventional dust-proof paper and security paper, and have advantages of being detectable, having little dust generation after friction, a water-proof property, a tear-proof property, the ability to be written upon, and the ability to be printed.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
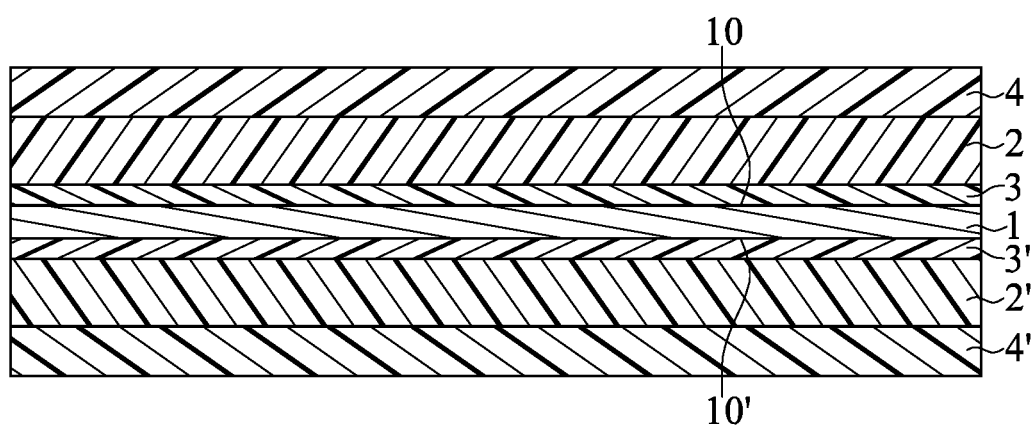
FIG. 1 is a cross-sectional view of a detectable dust-proof paper according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

If not specially defined, the definitions of technical and scientific terms in the specification are the same as those known and understood by a person skilled in the art.

If not specially indicated, "%" shown in present disclosure is based on weight. When an upper limit and a lower limit are provided to define a numerical range in the present disclosure, any smaller ranges within the numerical range are also covered by the numerical range, just as if specifically indicated as other upper and lower limits within the numerical range.

As mentioned above, the detectable dust-proof paper of the present disclosure can be used as both a dust-proof paper and a security paper, and can be used in a dust-free room by researchers. The surface of the detectable dust-proof paper does not easily generate dust after friction so that problems relating to the equipment or product line being affected by dust or the environment being polluted by dust can be improved. After friction, the security paper of the present disclosure will generate dust with a diameter larger than 0.3 μm at a concentration of lower than 100 count/ft$^3$ which is calculated by a particle counter. In addition, when the security paper carried by a researcher passes by a detector, the detector will send out a warning serving as a reminder to protect trade secrets.

Referring to FIG. 1, FIG. 1 is a cross-sectional view of a detectable dust-proof paper according to a first embodiment of the present disclosure. In the first embodiment, the detectable dust-proof paper includes a detected layer 1, two plastic layers 2, 2' (a first plastic layer 2 and a second plastic layer 2'), two adhesive layers 3, 3' (a first adhesive layer 3 and a second adhesive layer 3'), and two ink-receptive layers 4, 4' (a first ink-receptive layers 4 and a second ink-receptive layers 4').

The detectable dust-proof paper of the present disclosure has an appearance and a function similar to those of a general detectable dust-proof paper. The detectable dust-proof paper of the present disclosure can further be used as a security paper and have a water-proof property and a tear-proof property. In an embodiment of the present disclosure, the detectable dust-proof paper of the present disclosure has flexibility, and a thickness of the detectable dust-proof paper ranges from 20 μm to 350 μm. The thickness of the detectable dust-proof paper can be adjusted according to different requirements.

Due to the inclusion of the detected layer 1, the detectable dust-proof paper can be detected by the corresponding detector so that the detectable dust-proof paper can also be used as a security paper. It should be noted that the detected layer 1 is not limited to being made of a specific material. The detected layer 1 can be made of any material only as long as the detectable dust-proof paper is able to be detected. In a preferable embodiment, the detected layer 1 is made of a magnetic material, such as metal. Specifically, the detected layer 1 can be made of aluminum, copper, nickel, iron or a mixture or an alloy thereof. Accordingly, the detector corresponding to the detected layer 1 can be a metal detector or an X-ray detector.

Specifically, the detected layer 1 of the first embodiment is a metal foil. In a preferable embodiment, the detected layer 1 is an aluminum foil. Metal has good malleability so that the metal foil can be thinner than 10 μm. Even if the detectable dust-proof paper is a multilayered structure, the detectable dust-proof paper of the present disclosure still can have a thickness similar to that of a general paper. Therefore, the thickness of the detectable dust-proof paper will not cause inconvenience in use and transportation. In an embodiment of the present disclosure, a thickness of the metal foil is 4 μm to 8 μm; preferably, the thickness of the metal foil is 6 μm. However, the present disclosure is not limited thereto.

In an embodiment of the present disclosure, the detected layer 1 can have a plurality of holes uniformly formed on the metal foil. Therefore, an amount of metal used to form the detected layer 1 can be reduced and the detectable dust-proof paper of the present disclosure still can be detected.

When the metal foil with the plurality of holes is served as the detected layer 1, the material cost can be reduced and the weight of the detectable dust-proof paper can be lightened. In addition, after a formation of the plurality of holes, a contact area between the detected layer 1 and the two plastic layers 2, 2' is increased, which is beneficial for future enhancements of the connecting force between the detected layer 1 and the two plastic layers 2, 2'. For example, an adhesive agent can be applied between the detected layer 1 and the two plastic layers 2, 2' so as to enhance the connecting force between the detected layer 1 and the two plastic layers 2, 2'. A more specific illustration thereof is provided below.

In an embodiment of the present disclosure, the detected layer 1 includes at least one metal. The metal can exist in a metal fiber form and/or a metal particle form. The metal fiber and/or the metal particles are uniformly dispersed in the detected layer 1. However, the example illustrated above is only one of the available embodiments and should not be taken as limitation of the scope of the present disclosure.

The detected layer 1 has two opposite surfaces 10, 10'. The two plastic layers 2, 2' are respectively disposed on the two opposite surfaces 10, 10' of the detected layer 1. In other words, the detected layer 1 is sandwiched between the two plastic layers 2, 2' or embedded between the two plastic layers 2, 2'. In the first embodiment, the detected layer 1 is completely encapsulated by the two plastic layers 2, 2'. The detected layer 1 is not exposed outside so that the appearance of the detected layer 1 is the same as general paper. The detected layer 1 cannot be removed from the detectable dust-proof paper so that people with bad intention cannot easily leak the confidential information. Therefore, the internal confidential information can be protected.

The material forming the two plastic layers 2, 2' can be a polyethylene, a biaxially oriented polypropylene, a casting polypropylene, a casting polyethylene terephthalate, a biaxially oriented polyethylene terephthalate, or a polyimide.

The polyethylene can be an ethylene homopolymer, an ethylene copolymer, or a mixture thereof. The ethylene homopolymer is a polymer polymerized from an ethylene served as a monomer. A polydispersity index (PDI) of the ethylene homopolymer is from 1.5 to 3.5. The polydispersity index is defined by a ratio of a mass average molecular weight over a number average molecular weight which is abbreviated as Mw/Mn. The ethylene copolymer is a polymer polymerized from an ethylene and other one or more monomer. The polydispersity index of the ethylene copolymer is more than 3.5. However, the present disclosure is not limited thereto.

The materials of the two plastic layers 2, 2' can be the same or different according to requirements. Thicknesses of the two plastic layers 2, 2' ranges from 20 μm to 80 μm and the thicknesses of the two plastic layers 2, 2' can be adjusted according to different requirements. For example, in the first embodiment of the present disclosure, the thickness of the two plastic layers 2, 2' is 47 μm. However, the present disclosure is not limited thereto.

When the detected layer 1 is a metal foil, the material difference between the detected layer 1 and the two plastic layers 2, 2' (metal and plastic) results in a weak connecting force between the detected layer 1 and the two plastic layers 2, 2'. Therefore, the two surfaces 10, 10' of the detected layer 1 can be coated by a primer before the two plastic layers 2, 2' are disposed, so that the two adhesive layers 3, 3' with a thickness of 1 μm to 5 μm can be formed between the detected layer 1 and the two plastic layers 2, 2', respectively. By forming the two adhesive layers 3, 3', the connecting force between the detected layer 1 and the two plastic layers 2, 2' can be increased. In the first embodiment, the thickness of the two adhesive layers 3, 3' is 2 μm. However, the present disclosure is not limited thereto.

In an embodiment of the present disclosure, a material of the two adhesive layers 3, 3' is a waterborne polyurethane, an acrylic resin, or a combination thereof. In a preferable embodiment, the two adhesive layers 3, 3' is formed from a combination of the waterborne polyurethane and the acrylic resin. The two adhesive layers 3, 3' include 1 wt % to 70 wt % of the waterborne polyurethane and 1 wt % to 70 wt % of the acrylic resin. However, the material of the two adhesive layers 3, 3' is not limited thereto. Any material that can enhance the connecting force between the detected layer 1 and the two plastic layers 2, 2' falls within the scope of the present disclosure.

For a better ink-receptive effect (including organic ink and/or inorganic ink) of the detectable dust-proof paper of the present disclosure, the two ink-receptive layers 4, 4' can be respectively disposed on the two plastic layers 2, 2'.

Materials of the two ink-receptive layers 4, 4' can be the same or different according to different requirements. For example, when materials of the two ink-receptive layers 4, 4' are different, the ink-receptive layer 4 can be suitable for being written upon by a water-based ballpoint pen, an oil-based ballpoint pen, or a pencil, and the ink-receptive layer 4' can be suitable for absorbing ink printed by a laser printer or an inkjet printer so as to be used as a copier paper. Therefore, by means of the use of the two ink-receptive layers 4, 4', the detectable dust-proof paper of the present disclosure can be adjusted to have multiple functions, such as being suitable for being written by a water-based ballpoint pen, an oil-based ballpoint pen, or a pencil, and being suitable for absorbing ink printed by a laser printer or an inkjet printer.

In other words, the two ink-receptive layers 4, 4' of the present disclosure can replace the paper layers of the security paper used to cover the magnetic material in a conventional technology. Therefore, the detectable dust-proof paper of the present disclosure not only has the functions of the conventional dust-proof paper, but also possesses a water-proof property and a tear-proof property which are not possessed by the conventional detectable dust-proof paper. The detectable dust-proof paper of the present disclosure has advantages of the ability to be detected, little dust generation after friction, a water-proof property, a tear-proof property, the ability to be written upon, and the ability to be printed.

Specifically, the two ink-receptive layers 4, 4' are formed from a resin, at least one inorganic ink-absorption material, and a hardener. The resin of the two ink-receptive layers 4, 4' can be the same or different with the material used to form the two plastic layers 2, 2'. That is, the resin can be a polyolefin, a polyester, a polyamide, or a combination thereof or the resin can be an acrylic resin, a waterborne polyurethane, a polyvinyl alcohol, or a combination thereof.

The at least one inorganic ink-absorption material can enhance the ability of ink-absorption of the two ink-receptive layers 4, 4' so that the color intensity at a single point and the printed color saturation can be increased. Other properties, such as a whiteness and a fog density, needed for the detectable dust-proof paper can also be provided. The addition of the inorganic ink-absorption material can adjust the appearance of the detectable dust-proof paper to be similar to that of a general paper and appear to be white.

Based on the total weight of the ink-receptive layers 4, 4' being 100 wt %, a content of the inorganic ink-absorption material ranges between a value larger than 0 wt % and 75 wt %. The content of the inorganic ink-absorption material differs from a thickness of the ink-receptive layers 4, 4'. In an embodiment of the present disclosure, the thickness of the ink-receptive layers 4, 4' ranges from 10 μm to 40 μm. In a preferable embodiment, the thickness of the ink-receptive layers 4, 4' is 20 μm. The inorganic ink-absorption material is selected from the group consisting of: aluminum oxide ($Al_2O_3$), aluminum hydroxide ($Al(OH)_3$), silicon dioxide ($SiO_2$), calcium carbonate ($CaCO_3$), titanium dioxide ($TiO_2$), barium sulfate ($BaSO_4$), and a combination thereof. However, the present disclosure is not limited thereto.

In other embodiments, the inorganic ink-absorption material can contain titanium dioxide, barium sulfate, and calcium carbonate. Based on the total weight of the inorganic ink-absorption material as 100 wt %, an amount of the titanium dioxide ranges from 0.01 wt % to 80 wt %, an amount of the barium sulfate ranges from 0.01 wt % to 80 wt %, and an amount of the calcium carbonate ranges from 0.01 wt % to 80 wt %. However, the example illustrated above is only one of the available embodiments and should not be taken as limitation of the scope of the present disclosure.

In a preferable embodiment, the inorganic ink-absorption material exists in a particle form. The calcium carbonate particles have high porosity and high surface area so that the addition of the calcium carbonate can increase the opacity and the ink-absorption rate of the ink-receptive layers 4, 4'.

Figure 2:
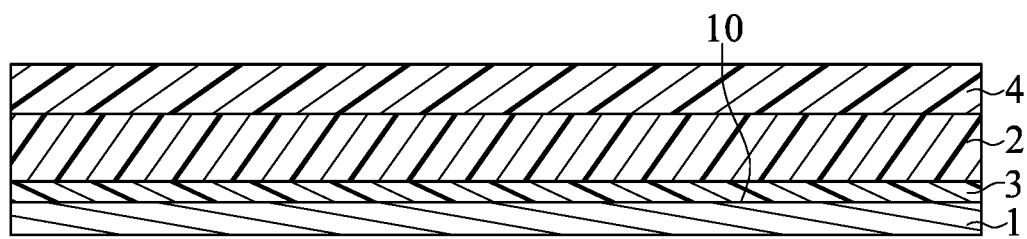
FIG. 2 is a cross-sectional view of the detectable dust-proof paper according to a second embodiment of the present disclosure.

Referring to FIG. 2, FIG. 2 is a cross-sectional view of the detectable dust-proof paper according to a second embodiment of the present disclosure. The detectable dust-proof paper can be a single-sided writing paper. That is, the detectable dust-proof paper can only include a detected layer 1, a plastic layer 2, an adhesive layer 3, and an ink-receptive layer 4. The plastic layer 2 is disposed on one surface of the detected layer 1. The adhesive layer 3 is sandwiched between the detected layer 1 and the plastic layer 2. The ink-receptive layer 4 is disposed on the plastic layer 2. The detected layer 1, a plastic layer 2, an adhesive layer 3, and an ink-receptive layer 4 are similar to those mentioned in the first embodiment, and is not repeated herein.

In conclusion, the detectable dust-proof paper of the present disclosure has the technical features of "the detectable dust-proof paper including the detected layer 1, the plastic layers 2, 2', and the ink-receptive layers 4, 4'" and "the ink-receptive layers 4, 4' containing an inorganic ink-absorption material ranging between a value larger than 0 wt % and 75 wt %". Therefore, the detectable dust-proof paper of the present disclosure can replace the detectable dust-proof paper and the security paper in a conventional technology and have advantages of the ability to be detected, little dust generation after friction, a water-proof property, a tear-proof property, the ability to be written upon, and the ability to be printed.

Further, by virtue of "the ink-receptive layers 4, 4'" of the detectable dust-proof paper of the present disclosure, the adhesion of the organic ink or inorganic ink onto the detectable dust-proof paper can be enhanced.

Further, the detectable dust-proof paper of the present disclosure has technical features of "the ink-receptive layers 4, 4' containing an inorganic ink-absorption material" and "the inorganic ink-absorption material being selected from the group consisting of: aluminum oxide, aluminum hydroxide, silicon dioxide, calcium carbonate, titanium dioxide, barium sulfate, and a combination thereof" so that the detectable dust-proof paper can have a good ink-adsorption ability, a high color intensity at a single point, and a high printed color saturation.

Further, the detectable dust-proof paper of the present disclosure has technical features of "the adhesive layer 3, 3' being sandwiched between the detected layer 1 and the plastic layer 2, 2'" and "the adhesive layer 3, 3' is formed from a mixture of a waterborne polyurethane and an acrylic resin" so as to enhance the connecting force between the detected layer 1 and the plastic layers 2, 2'.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A detectable dust-proof paper, comprising:
   a detected layer having two opposite surfaces; wherein the detected layer includes at least one metal, and the at least one metal is selected from the group consisting of: aluminum, copper, nickel, iron, and a mixture or an alloy thereof;
   a first plastic layer disposed on one of the two surfaces of the detected layer; wherein a material of the first plastic layer is selected from the group consisting of: a polyolefin, a polyester, a polyamide, and a combination thereof; and
   a first ink-receptive layer capable of being written or printed upon disposed on the first plastic layer and containing an inorganic ink-absorption material ranging between a value larger than 0 wt % and 75 wt %;
   wherein a thickness of the detectable dust-proof paper is from 20 µm to 350 µm.

2. The detectable dust-proof paper according to claim 1, wherein the detected layer is a metal foil.

3. The detectable dust-proof paper according to claim 1, wherein the detected layer includes at least one metal particle or at least one metal fiber, and the at least one metal particle or the at least one metal fiber is dispersed in the detected layer.

4. The detectable dust-proof paper according to claim 1, wherein the inorganic ink-absorption material is selected from the group consisting of: aluminum oxide, aluminum hydroxide, silicon dioxide, calcium carbonate, titanium dioxide, barium sulfate, and a combination thereof.

5. The detectable dust-proof paper according to claim 1, wherein the first plastic layer is formed from a material selected from the group consisting of: a polyethylene, a biaxially oriented polypropylene, a casting polypropylene, a casting polyethylene terephthalate, a biaxially oriented polyethylene terephthalate, and a polyimide.

6. The detectable dust-proof paper according to claim 1, further comprising a first adhesive layer sandwiched between the first plastic layer and the detected layer; wherein the first adhesive layer is formed from a mixture of a waterborne polyurethane and an acrylic resin.

7. The detectable dust-proof paper according to claim 6, wherein the first adhesive layer contains 1 wt % to 70 wt % of the waterborne polyurethane and 1 wt % to 70 wt % of the acrylic resin.

8. The detectable dust-proof paper according to claim 1, further comprising a second plastic layer and a second ink-receptive layer; wherein the second plastic layer is disposed on another of the two surfaces of the detected layer, and a material of the second plastic layer is selected from the group consisting of: a polyolefin, a polyester, a polyamide, and a combination thereof; wherein the second ink-receptive layer is disposed on the second plastic layer and contains an inorganic ink-absorption material ranging between a value larger than 0 wt %, and 75 wt %.

9. The detectable dust-proof paper according to claim 1, further comprising a second adhesive layer sandwiched between the second plastic layer and the detected layer; wherein the second adhesive layer is formed from a mixture of a waterborne polyurethane and an acrylic resin.

* * * * *